United States Patent [19]
Proakis et al.

[11] Patent Number: 5,844,951
[45] Date of Patent: Dec. 1, 1998

[54] METHOD AND APPARATUS FOR SIMULTANEOUS BEAMFORMING AND EQUALIZATION

[75] Inventors: John G. Proakis, Lexington; Milica Stojanovic, Woods Hole, both of Mass.

[73] Assignees: Northeastern University, Boston; Woods Hole Oceanographic Institution, Woods Hole, both of Mass.

[21] Appl. No.: 815,324

[22] Filed: Mar. 10, 1997

Related U.S. Application Data

[63] Continuation of Ser. No. 620,479, Mar. 22, 1996, abandoned, which is a continuation of Ser. No. 258,621, Jun. 10, 1994, abandoned.

[51] Int. Cl.⁶ .................................................. H04B 1/02
[52] U.S. Cl. .......................... 375/347; 455/137; 375/233
[58] Field of Search .................................. 375/355, 347, 375/326, 346, 327, 340, 233, 343, 232, 267, 285, 354; 364/724.19, 724.2, 728.03; 455/132, 137, 139; 367/117, 45, 50

[56] References Cited

U.S. PATENT DOCUMENTS

| | | | |
|---|---|---|---|
| 3,940,694 | 2/1976 | Price et al. .............................. | 325/42 |
| 4,468,786 | 8/1984 | Davis ...................................... | 375/11 |
| 4,599,732 | 7/1986 | LeFever ................................. | 375/231 |
| 4,630,262 | 12/1986 | Callens et al. ........................ | 370/81 |
| 4,644,562 | 2/1987 | Kavehrad et al. .................... | 375/14 |
| 4,688,213 | 8/1987 | Raychaudhuri ....................... | 370/93 |
| 4,733,402 | 3/1988 | Monsen ................................. | 375/100 |
| 4,821,289 | 4/1989 | Peile ...................................... | 375/14 |
| 4,872,163 | 10/1989 | Follett et al. ......................... | 370/94 |
| 4,972,434 | 11/1990 | Le Polozec et al. ................. | 375/347 |
| 5,005,189 | 4/1991 | Hackett, Jr. ........................... | 375/101 |
| 5,029,186 | 7/1991 | Maseng et al. ....................... | 375/94 |
| 5,031,193 | 7/1991 | Atkinson et al. ..................... | 375/347 |
| 5,052,000 | 9/1991 | Wang et al. .......................... | 371/43 |
| 5,056,117 | 10/1991 | Gitlin et al. .......................... | 375/102 |
| 5,063,573 | 11/1991 | Langewellpott ..................... | 375/14 |
| 5,111,484 | 5/1992 | Karabinis ............................. | 375/94 |
| 5,127,051 | 6/1992 | Chan et al. ........................... | 380/49 |
| 5,132,988 | 7/1992 | Fisher et al. .......................... | 375/14 |
| 5,142,551 | 8/1992 | Borth et al. ........................... | 375/7 |
| 5,155,742 | 10/1992 | Ariyavistakul et al. ............. | 375/13 |
| 5,185,764 | 2/1993 | Baier ..................................... | 375/13 |
| 5,199,047 | 3/1993 | Koch ..................................... | 375/13 |
| 5,202,903 | 4/1993 | Okanoue ............................... | 375/347 |
| 5,204,874 | 4/1993 | Falconer et al. ..................... | 375/1 |
| 5,206,863 | 4/1993 | Nazarenko et al. .................. | 371/37.1 |
| 5,214,675 | 5/1993 | Mueller et al. ....................... | 375/94 |
| 5,231,648 | 7/1993 | Driedger et al. ..................... | 375/13 |
| 5,234,347 | 8/1993 | Bonta et al. .......................... | 341/149 |
| 5,249,204 | 9/1993 | Funderburk et al. ................ | 375/97 |

(List continued on next page.)

OTHER PUBLICATIONS

Stojanovic et al, "Reduced–complexity Simultaneous Transforming & Equalization for underwater Acoustic Comm." IEEE Journal of Oceanic Engineering, 1993, pp. 46–51.

Edward A. Lee et al., "Digital Communication," Kluwer Acadamic Publisher, pp. 548–558, 1988.

Catipovic, J. et al, An Acoustic Telemetry System for Deep Ocean Mooring Data Acquisition and Control Woods Hold Oceanographic Institution, pp. 1–6.

Catipovic, Josko A., Spatial diversity Processing for Underwater Acoustic Telemetry, IEE Journal of Oceanic Engineering, vol. 15, No. 1, Jan., 19990, pp. 1–7.

(List continued on next page.)

*Primary Examiner*—Tesfaldet Bocure
*Attorney, Agent, or Firm*—Weingarten, Schurgin, Gagnebin & Hayes LLP

[57] ABSTRACT

A method and apparatus for multichannel combining and equalization in a multichannel receiver is described. The receiver jointly performs diversity combining, equalization and synchronization. The method and apparatus of the present invention may be used to provide a reduced complexity adaptive multichannel receiver for use in a digital communication system.

12 Claims, 4 Drawing Sheets

U.S. PATENT DOCUMENTS

| | | |
|---|---|---|
| 5,249,205 | 9/1993 | Chennakeshu et al. .................. 375/101 |
| 5,251,233 | 10/1993 | Labedz et al. ............................. 375/12 |
| 5,251,237 | 10/1993 | Baier .......................................... 375/99 |
| 5,251,328 | 10/1993 | Shaw ........................................... 455/73 |
| 5,257,265 | 10/1993 | Su et al. ................................. 370/100.1 |
| 5,257,399 | 10/1993 | Kallin et al ............................... 455/33 |
| 5,263,052 | 11/1993 | Borth et al. ................................. 375/39 |
| 5,263,053 | 11/1993 | Wan et al. ................................... 375/58 |
| 5,285,482 | 2/1994 | Schier et al. .............................. 375/347 |
| 5,297,171 | 3/1994 | Koch .......................................... 375/347 |
| 5,301,167 | 4/1994 | Proakis et al. ............................ 367/134 |
| 5,379,046 | 1/1995 | Tsujimoto ................................. 342/378 |
| 5,473,333 | 12/1995 | Chiba et al. .............................. 342/378 |
| 5,528,581 | 6/1996 | De Bot ...................................... 375/347 |
| 5,537,443 | 7/1996 | Yoshino et al. ........................... 375/340 |
| 5,757,845 | 5/1998 | Fukawa et al. ........................... 375/200 |

OTHER PUBLICATIONS

Catipovic, Josko, et al., Underwater Acoustic Local Area Network for ROV and Instrument Communications, Woods Hole Oceanographis Institution, Woods Hole, MA 02543.

Lee E. Freitag, et al., A Long Term Deep–Water Acoustic Telemetry Experiment, Woods Hole Oceanographic Institution, Woods Hole, MA 02543.

David Chase, Code Combing–A Maximum Likelihood Decoding Approach for Combining an Arbitrary Number of Noisy Packets, IEE Transactions on Communications vol. Comm–33, No. 5, May, 1985, pp. 385–393.

Mordechai Segal, et al., Optimal source Localization and Tracking Using Arrays with Uncertainties in Sensor Locations, Technical Report, Woods Hold Oceanographic Institution, Aug., 1989, pp. 1–40.

Milica Stojanovic, et al., Coherent communications Over Long Range Underwater Acoustic Telemetry Channels, pp. 1–7.

Timothy F. Duda, Modeling Weak Fluctuations of Undersea Telemetry Signals, IEEE Journal of Oceanic Engineering vol. 16, No. 1, Jan. 1991, pp. 3–11.

Brady, David, et al., Robust Multiuser Communications for Underwater Acoustic channels, Woods Hole Oceanographic Institution, Woods Hole, MA 02543, May 1, 1992, pp. 1–15.

Brady, David, Asymptotic Multiuser Efficiency for Two Stage Detectors in AWGN Channels, The 1993 International Symposium on Information Theory, San Antonio, Texas, Jan., 1993.

X. Zhang, et al, Soft Decision Multistage Detection for Asynchronous AWGN Channels, The Proceedings of the 31st Annual Allerton Conference on Communications, Control and Computing.

D. Brady, et al., An Adaptive, Soft–Decision Multiuser Receiver for Underwater Acoustical Channels, Proceedings of the 1991 Asilomar Conference on Signals, Systems and Computers.

M. Stojanovic, et al. "Adaptive multichannel combining and equalization for underwater acoustic communications" Sep. 1993, pp. 1621–1631, J. Acoust. Soc AM 94(3) Pt. 1.

M. Stojanovic, et al. An Algotithm for Multichannel Coherent Digital Communications Over Long Range Underwater Acoustic Telemetry Channels, pp. (6) unnumbered.

Josko A. Catipovic, et al. "High Data Rate Acoustic Telemetry for Moving Rovs in A Fading Multipath Shallow Environment", pp. (8) unnumbered.

Milica Stojanovic, Coherent Digital Communications for Rapidly Fading Channels With Applications to Underwater Acoustics, Sep., 1993, pp. 1–199.

John G. Proakis, Adaptive Equilization Techniques for Acoustic Telemetry Channels, IEEE Journal of Oceanic Engineering vol. 16, No. 1, Jan., 1991.

METHOD AND APPARATUS FOR SIMULTANEOUS BEAMFORMING AND EQUALIZATION

This application is a continuation of application Ser. No. 08/620,479, filed Mar. 22, 1996, now abandoned which is a continuation of application Ser. No. 08/258,621, filed Jun. 10, 1994 now abandoned.

GOVERNMENT SUPPORT

This invention was made with government support. The U.S. Government has certain rights in this invention.

FIELD OF THE INVENTION

This invention relates to signal processing systems and more particularly to signal processing of communication signals.

BACKGROUND OF THE INVENTION

As is known in the art, communication systems typically includes a transmitting system and a receiving system. The transmitting system typically includes a transmitter. The transmitter may include multiple antennas. The receiving system typically includes one or more receiving sensors.

As is also known, signals received by multiple receiving sensors in a sensor array such as antenna or hydrophone arrays may be combined in a beamforming circuit. The beamforming circuit can be used to direct or steer the sensor array in a particular direction thereby placing nulls in the direction of all but a single signal which is to be received. The signal components received from each sensor of the sensor array are typically combined into a single channel signal which is then fed to a signal processor. The signal processor extracts data from the signal fed thereto.

One problem with achieving reliable, high-speed underwater acoustic (UWA) communications is the large amount of intersymbol interference (ISI) encountered in a typical ocean channel. One example of a dynamic multipath ocean channel in which many propagation paths meet at multiple convergence zones is a horizontal long-range deep water ocean channel. Shallow water channels in which multipath is comprised of both deterministic and random, bottom, volume and surface reverberation are also dynamic multipath ocean channels. Depending on the signaling rate used, ocean multipath can impose severe limitations on coherent reception, due to both the large time and frequency spreads which occur the in ocean channel.

As is also known, there exist two basic strategies for overcoming the multipath problem in UWA communications. The first approach is to provide signal protocols and signal transmission schemes which ensure the absence of ISI. The second approach is to provide receivers capable of compensating for the ISI.

The first approach includes the simplest strategy in which transmitted pulses having the same frequency are separated by a predetermined period of time which ensures that all channel reverberation will die out before each subsequent pulse is to be received. More complex systems use spread-spectrum signals to resolve multipath. Both of these techniques, however, sacrifice data throughput to eliminate the ISI.

As mentioned above, the second approach of dealing with multipath in UWA communications is to provide a receiver capable of compensating for the ISI. This approach is generally used in relatively sophisticated systems. Such systems compensate for the ISI in the received data sequence and thus efficiently use the available bandwidth.

Receivers capable of compensating for the ISI generally either use beamforming or equalization techniques to combat the multipath problem. Generally, beamforming techniques are typically used with systems having a large number of array sensors having a spacing and geometry which permit the sensors to reject interference by steering nulls in the direction of the interference.

Equalization techniques can be applied to horizontal UWA channels in which a single channel receiver is used. However, single-channel receiver performance is influenced by the spatial variability of UWA channels and high spatial variability may represent a serious limitation for single channel reception.

Diversity combining techniques are often used in conjunction with equalization techniques. In contrast to beamforming, diversity combining can be performed with as few as two sensors, which only need be separated far enough from each other to ensure independence of the received signals. Diversity combining alone, however, does not account for channel equalization, and thus should be used in conjunction with equalization schemes.

In multichannel receiver systems, multichannel combining schemes for reducing the ISI have been used in communication channels other than UWA channels. For example, multichannel combining schemes have been used in troposcatter.

SUMMARY OF THE INVENTION

While beamforming and diversity combining techniques can be used to mitigate ISI and fading caused by multipath propagation, these two techniques are generally considered to be fundamentally different approaches to solving the same problem.

It is recognized in the present invention that there exists a need for a joint diversity combining and equalization scheme. Such a scheme finds use in a wide variety of communication systems. For example, the joint diversity combining and equalization schemes of the present invention may be used in underwater communication systems and/or in digital mobile cellular radio systems.

Thus, in accordance with the present invention, a method and apparatus for multichannel combining and equalization in a communication system is described. The method and apparatus may be used in a multichannel receiver which includes a combiner. The receiver receives signals from a sensor array which may be provided for example as an antenna or a hydrophone array. When there exits a particular spatial distribution across the array, the combiner operates in a manner similar to a beamformer and a bank of filters matched to the individual path responses. Such a beamformer differs from a conventional beamformer in that it does not null-out the multiple signal reflections but rather makes use of them. The joint diversity combining and equalization scheme of the present invention makes use of multiple signal reflections by matching all of the multiple propagation paths and subsequently combines so obtained signals in a coherent manner. An optimal multichannel receiver for a general ISI communication channel can be derived without making assumptions about the spatial distribution of signals across the array. From the optimal receiver based on the maximum likelihood sequence estimation (MLSE) principles, a minimum mean-squared-error (MMSE) multichannel equalizer may be deduced. If a certain spatial distribution of signals exists, the parts of the optimal combiner responsible for beamforming, combining and equalization can be identified. Two classes of adaptive implementations exist. The two classes depend on whether or not the knowledge of spatial distribution of the signals is used by the receiver.

The first class of adaptive implementations makes no assumptions about the spatial signal distribution and thus corresponds to pure diversity combining. By interpreting the receiver as a beamformer and a combiner, a receiver structure which significantly reduces the complexity of a pure diversity combiner, while achieving the same performance may be provided. The second class of adaptive implementations explicitly uses knowledge of the angles of signal arrivals.

In accordance with a further aspect of the present invention, a multichannel receiver includes means for jointly performing diversity combining, equalization and synchronization. With such an arrangement, a receiver having implicit diversity improvement obtained by coherent processing of multiple signal arrivals in each of the diversity channels and the explicit diversity improvement obtained by coherent combining of signals from different channels is provided. The receiver can demodulate and detect digital data signals received from multiple sensors. The multichannel receiver may be fed signals, for example, from an array of hydrophones in an underwater communications system. The underwater communication channel through which the data signal is transmitted is time dispersive and distorts the transmitted signal in a way that is unknown to the receiver. The means adaptively combine and equalize the received signals from the hydrophone array. The means adaptively combine the signal components in an optimal way and adaptively equalizes the channel distortion. For example, when the mean square error is used as a criterian for optimizing the combiner equalizer, the combiner is the same as if the maximum likelihood sequence estimation criteria were used in the design of the receiver. Regardless of the optimization criteria used, the combiner remains the same. The jointly optimized combiner/equalizer is operated in an adaptive manner in accordance with a pre-determined algorithm. The algorithm may, for example, be based on a combination of a recursive least squares (RLS) scheme to generate equalizer tap-weight updates and a second-order digital phase-locked loop (DPLL) to generate carrier phase estimates. One example of an RLS algorithm which may be used in this scheme is a fast, numerically stable implementation of a transversal RLS.

In accordance with a still further aspect of the present invention, a method for demodulating and detecting digital data signals received in a multichannel receiver includes the steps of receiving signals from a plurality of sensors, converting the signals to baseband, decimating the signals, synchronizing data frames, determining receiver parameters, adaptively combining, and adaptively equalizing the signal components. With this particular technique, a method of demodulating and detecting digital data signals in a multichannel receiver is provided. The signals may be received from multiple sensors such as antenna elements or hydrophone signals. For example, the multichannel receiver may receive signals from an array of hydrophones in an underwater communications system. The underwater communication channel through which the data signal is transmitted is time dispersive and distorts the transmitted signal in a way that is unknown to the receiver. The signal components received at the multiple sensors are adaptively combined in an optimum way. Moreover, channel distortion is adaptively equalized. The jointly optimized combiner-equalizer method operates in an adaptive manner in accordance with a pre-determined algorithm which may, for example, be based on a combination of a recursive least squares (RLS) scheme to generate equalizer tap-weights and a second-order digital phase-locked loop (DPLL) to generate carrier phase estimates.

The receiver parameters which are thus optimized include but are not limited to (1) the tap weights of the multichannel combiner; (2) the equalizer coefficients; and (3) the carrier phase estimates.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
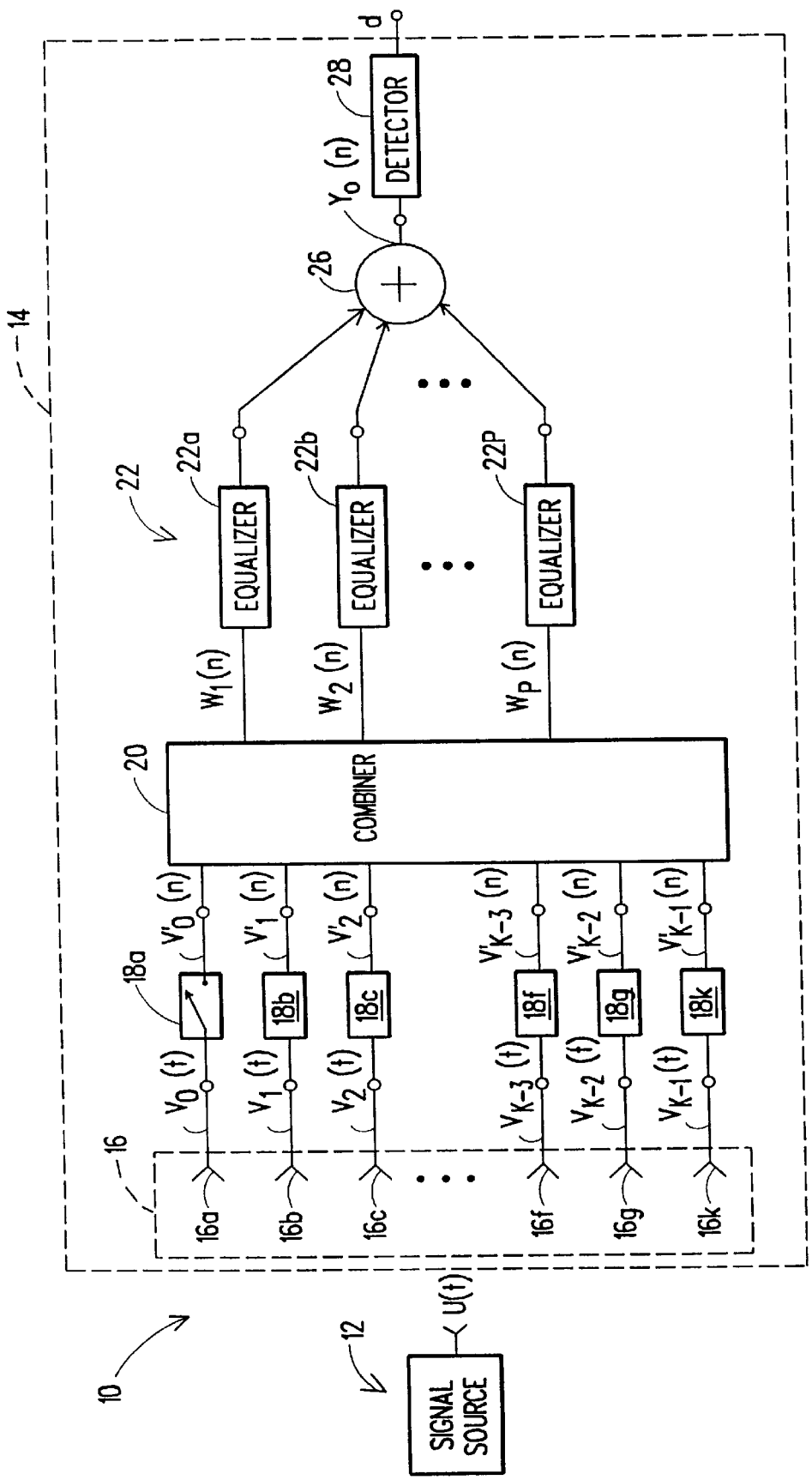
FIG. 1 is a block diagram of a communication system.

Referring now to FIG. 1, a communication system 10 includes a signal source 12 which produces a signal waveform u(t) from a sequence of data symbols d. The signal waveform propagates through a transmission media which may, for example, be air or water. Signals discussed herein are taken to be equivalent baseband signals and required frequency translations not explicitly shown here may be accomplished using any technique well known to those of ordinary skill in the art.

A receiving system 14 includes a sensor array 16 having a plurality of sensors 16a–16K generally denoted 16. Sensors 16 may be provided for example as an array of hydrophone sensors in an underwater communication system or alternatively sensor array 16 may be provided as an antenna array in an RF communication system. Sensors 16 receive the signal transmitted by signal source 12 and provide input signals $v_0(t)$–$v_{K-1}(t)$ to one of a corresponding plurality of sampling circuits 18a–18k generally denoted 18. In the preferred embodiment sampling circuits are provided as analog-to-digital converter circuits (ADCs) which are placed immediately after sensors 16. It should be noted however that the sampling circuits 18 may alternatively be placed after the combiner or even after the equalizer circuits 22. Alternatively still the received signal can itself be a digital signal. That is frequency translation can be done in either the analog or digital signal domain.

Sampling circuits 18 feed sampled signals $v_0'(n)$–$v_{K-1}'(n)$ to a combiner 20. Combiner 20 receives signals fed thereto on K input channels, combines the K input signals $v_0'(n)$–$v_{K-1}'(n)$ and provides a plurality P of output signals $w_1(n)$–$w_P(n)$ to a corresponding plurality of fractionally spaced equalizer circuits $22a$–$22_p$ generally denoted 22.

Equalizer circuits 22 receive the signals fed thereto and provide the signals to a summer circuit 26. The summer 26 combines the signals fed thereto and provides a single output signal y(t) to a detector circuit 28. The detector 28 recovers the transmitted sequence of data symbols d.

Channel Model and the Optimal Receiver

In a communications channel the transmitted signal u(t) propagates over a number of paths. Each of the communication paths may be characterized by its complex baseband impulse response $C_p(t)$. By observing the signal u(t) in a time-interval $T_{obs}$ in which the channel conditions can be regarded as fixed, the multipath signal is received over K equally spaced sensor, with the $p^{th}$ path propagation delay $T_p$ between them. For simplicity, a narrow-band case with an ideal plane-wave propagation is here considered.

The signal traveling on the $p^{th}$ path may be expressed at the reference sensor as:

$$u_p(t)=u(t)*c_p(t) \qquad \text{Equation 1}$$

in which in the narrowband case, $u_p(t-kT_p) \approx u_p(t)$, for all sensors k=0...K-1.
The $k^{th}$ sensor will then observe this signal as:

$$u_p(t)e^{-jk\phi_p} \qquad \text{Equation 2}$$

where $\phi_p = \omega_o T_p$ represents the angle associated with the $p^{th}$ propagation path; and $\omega_o$ is the frequency of the carrier signal in units of radians per second.

The total received signal at sensor k may be expressed as:

$$v_k(t) = \sum_{p=1}^{P} u_p(t)e^{-jk\phi_p} + n_k(t) \qquad \text{Equation 3}$$

in which $n_k(t)$ corresponds to a noise component and where it has been assumed that there are P propagation paths.

The noise component $n_k(t)$ is assumed to be independent of the signal $u_p(t)$. That is, no multipath is treated as interference. In matrix notation, the received signal may be expressed as:

$$\begin{bmatrix} v_o(t) \\ \cdot \\ \cdot \\ \cdot \\ v_{K-1}(t) \end{bmatrix} = \begin{bmatrix} 1 & \cdots & 1 \\ e^{-j\phi_1} & \cdots & e^{-j\phi_P} \\ \cdot & & \cdot \\ \cdot & & \cdot \\ \cdot & & \cdot \\ e^{-j(K-1)\phi_1} & \cdots & e^{-j(K-1)\phi_P} \end{bmatrix} \begin{bmatrix} u_1(t) \\ \cdot \\ \cdot \\ \cdot \\ u_p(t) \end{bmatrix} + \begin{bmatrix} n_o(t) \\ \cdot \\ \cdot \\ \cdot \\ n_{K-1}(t) \end{bmatrix} \qquad \text{Equation 4}$$

which may be re-written as:

$$v(t)=\phi u(t)+n(t)=v(t)+n(t). \qquad \text{Equation 5}$$

The signal $u_p(t)$ depends on the underlying transmitted sequence of data symbols {d(n)} as $$u_p(t)=\sum_n d(n)g_p(t-nT) \qquad \text{Equation 6}$$

in which:

$g_p(t)=c_p(t)*g(t)$ corresponds to the overall impulse response of the $p_{th}$ propagation path which includes all the transmitter and receiver filtering g(t); and T is the symbol duration, which for the narrow-band case satisfies the condition $T>>T_p$.

In vector notation, Equation 6 may be written as shown in Equation 7:

$$u(t)=\Sigma_n d(n)g(t-nT). \qquad \text{Equation 7}$$

Using Equation 7, Equation 5 may be re-written as shown in Equation 8 to provide a new expression for the received signal:

$$v(t)=\Sigma_n d(n)f(t-nT)+n(t) \qquad \text{Equation 8}$$

in which:

f(t)=$\Phi$g(t) is the vector of overall channel responses where:

$$f_k(t) = \sum_{p=1}^{P} g_p(t) e^{-jk\phi_p} \quad k=0\ldots K-1. \qquad \text{Equation 9}$$

Regardless of the existence of any spatial signal distribution such as that expressed in Equation 9, the received signal can always be expressed in the form of Equation 8.

In view of the above, the optimal maximum likelihood (ML) receiver may be designed on the basis that, the noise vector n(t) is assumed to be zero-mean, temporally white Gaussian noise, with a known covariance $R_n$. It should be noted that while this assumption is not entirely correct for all UWA channels, it is generally recognized as a good first approximation. This approximation is made because it provides easier treatment of the combining problem, and leads directly to suboptimal structures insensitive to the noise distribution characteristics.

Assuming the channel response f(t) is known, the log-likelihood function of the data sequence d={d(n)} is $$\Lambda(d)=-\int_{T_{obs}} [v(t)-\bar{v}(t)]'R_n^{-1}[v(t)-\bar{v}(t)]dt \qquad \text{Equation 10}$$

In equation 10 the symbol prime denotes a conjugate transpose.

Maximizing $\Lambda(d)$ with respect to the data sequence is equivalent to maximizing the function $$L(d)=2Re\Sigma_n d^*(n)y(n)-\Sigma_n\Sigma_m d^*(n)R_{n-m}d(m) \qquad \text{Equation 11}$$

where $$y(n)=\int_{T_{obs}} f'(t-nT)R_n^{-1}v(t)dt \qquad \text{Equation 12}$$

and $$R_{n,m}=R_{n-m}=\int_{T_{obs}} f'(t-nT)R_n^{-1}f(t-mT)dt \qquad \text{Equation 13}$$

The ML estimate of the data sequence d is the valid sequence which maximizes L(d).

Figure 1A:
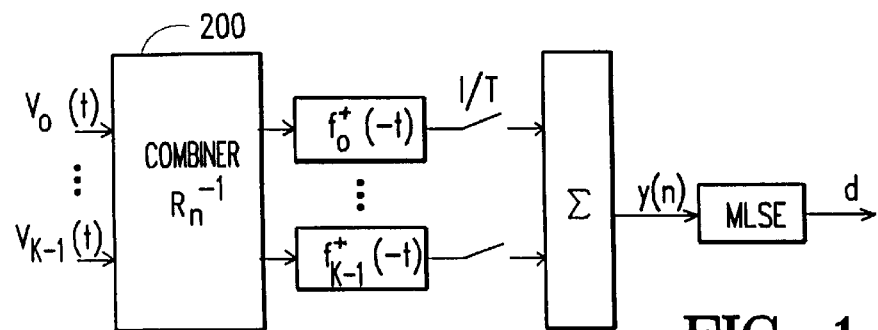
FIG. 1A is a block diagram of an optimal multichannel receiver.

Equation 12 implies the structure of an optimal multi-channel combiner in which received signals are processed in a bank of matched filters having outputs which are summed and sampled at the signaling rate. Such a receiver structure as shown in FIG. 1A. The front part of such a receiver, responsible for generating a sequence {y(n)} of the matched filter outputs, is the optimal combiner 200. All the subsequent processing is performed on a single, discrete-time signal.

As in the case of a single receiving element, the output sequence {y(n)} represents a set of sufficient statistics for the detection of the transmitted data sequence. The postprocessor may use the Viterbi algorithm, for example, to determine this sequence, based on the knowledge of the composite channel autocorrelation $\{R_m\}$.

Since an analogy may be drawn between the optimal multichannel receiver obtained, and its corresponding single-channel part, standard procedures for obtaining suboptimal structures in which an equalizer replaces the computationally complex optimal post-processor can be applied. This approach directly leads to the minimum mean square error (MMSE), linear or decision-feedback equalizers. The only function relevant for the design of the optimal multichannel equalizers is the composite channel spectrum:

$$R(z) = \Lambda_m R_m z^{-m} \qquad \text{Equation 14}$$

Given this function, and assuming that the data symbols are independent with $E\{|d(n)|^2\}=1$, the MMSE solution for a linear equalizer transfer function in the case of spatially white noise, may be expressed as:

$$A(z) = 1/(1+R(z)) \qquad \text{Equation 15}$$

The MMSE achieved by this equalizer on a stationary channel may be expressed as:

$$MMSE_1 = \int_{-\pi}^{\pi} \frac{1}{1+R(e^{j\omega})2\pi} \, d\omega \qquad \text{Equation 16}$$

The role of multichannel combining in alleviating the equalization problem now becomes apparent. Since $R(e^{j\omega})$ is the sum of all the channel spectra $R_k(e^{j\omega})$, as long as spectral nulls do not coincide in all of the channels, there will not be a null in the composite spectrum $R(e^{j\omega})$, a situation in which linear equalizers encounter difficulties.

Equalization methods are in general preferred to the MLSE in UWA communications because they do not depend on the assumptions about the statistical properties of the noise. Also, MLSE techniques may become computationally too complex for applications such as high-rate long-range acoustic communications where channel responses lasting several tens of symbol intervals are commonly encountered. Since in the present discussion the combining problem is of primary concern, linear equalization methods are used in the remainder of the description.

Optimal multichannel decision-feedback equalization is discussed below in conjunction with FIG. 2.

The optimal combiner 200 of FIG. 1A makes no assumptions about the spatial distribution of signals across the array. Should there exist a relationship between signals observed at different array sensors, the optimal combiner provides a special interpretation. This is important because it eventually leads to different implementations.

For the narrow-band case and plane-wave propagation, the channel responses are related by Equation 9. In this case, the output sequence y(n) of the optimal combiner may be expressed as:

$$y(n) = \Lambda_{T_{obs}} g'(t-nT) \Phi' R_n v(t) dt \qquad \text{Equation 17}$$

Figure 1B:
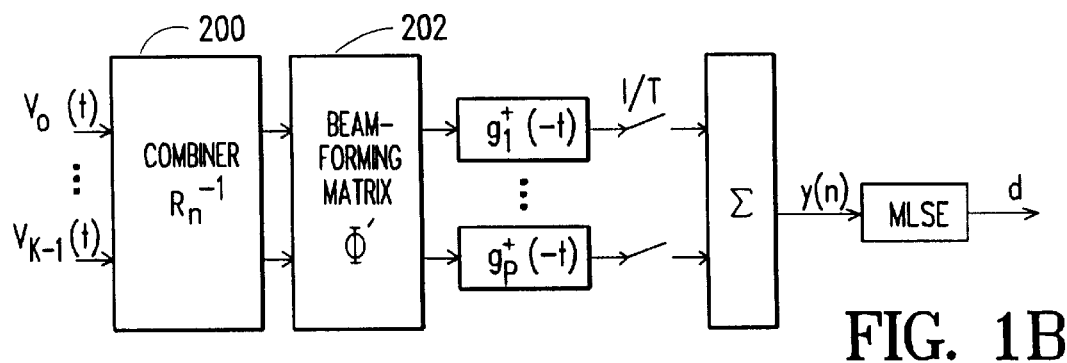
FIG. 1B is a block diagram of an optimal multichannel receiver for the narrow band case and plane-wave propagation.

This expression implies a combiner structure as shown in FIG. 1B.

In the structure of FIG. 1B, the parts of the receiver corresponding to beamforming parts and those corresponding to matched filtering and coherent combining are clearly separated. The beamforming part is identified as depending only on the angles of signal arrivals, and is represented by a K×P beamforming matrix $\Phi$ 202. The P signals at the beamformer outputs correspond to the P propagation paths, and the P filters $g^*_p(-t)$ are matched to the individual path responses. In the simplest case, when there is no dispersion on individual paths, each of these filters is given by a complex channel gain multi-plying the delayed basic transmitter pulse.

It should be noted that if the beamformer were used in the conventional sense to produce the spatially separated signals at its output, it would have used the transformation $B=\Phi (\Phi'101)^{-1}$ on the input signals. Following such a beamformer directly by the matched filters would result in a lower output signal-to-noise ratio $SNR_o$, since it introduces additional noise correlation. This is illustrated in the following example.

Consider a case in which the communication system has two propagation paths and thus P=2. Each of the propagation paths has an impulse response characteristic which can be expressed as $g_p(t) = c_p g(t - \tau_p)$, and spatially white noise which can be expressed as $R_n = N_o I$. Single pulse transmission results in the optimal combiner output signal-to-noise ratio as shown in Equation 18.

$$SNR_o = R_o = \frac{E_s}{N_o} [K(|C_1|^2 + |C_2|^2) + 2Re\{\rho c_1^* c_2 f_K(\Delta\phi)\}] \qquad \text{Equation 18}$$

where $$\Delta\phi = \phi_1 - \phi_2, f_k(\Delta\phi) = \sum_{k=0}^{k-1} e^{jk\Delta\phi} \qquad \text{Equation 19}$$

$$E_s = \int_{-\infty}^{+\infty} |g(t)|^2 dt,$$

where $$\rho = \frac{\int_{-\infty}^{+\infty} g_1^*(t)(g)_2(t) dt}{\left[\int_{-\infty}^{+\infty} |g_1(t)|^2 dt \int_{-\infty}^{+\infty} |g_2(t)|^2 dt\right]^{1/2}}$$

When the differential delay between paths is such that they become uncorrelated, $\rho=0$, the output signal-to-noise ratio reduces to:

$$SNR_o = R_o = \frac{E_s}{N_o} K(|c_1|^2 + |c_2|^2). \qquad \text{Equation 20}$$

If the paths are of equal power, it is seen that the receiver gain is proportional both to the number of sensors and the number of propagation paths. Thus $SNR_o \sim KP$.

On the other hand, for the conventional beamformer, in which $B=\Phi(\Phi'101)^{-1}$, and in which the beamformer is followed by the matched filters, the output $SNR_o$ in the case of uncorrelated multipath is computed as:

$$SNR = SNR_o \left[ 1 - \frac{1}{K^2} ((\sin K\Delta\phi/2)/(\sin\Delta\phi/2))^2 \right] \qquad \text{Equation 21}$$

For a large number of sensors, the degradation of the SNR in a conventional beamformer as shown in Equation 21 is not of major concern. The optimal beamformer, however, never becomes numerically ill-conditioned.

Adaptive Multichannel Equalization

Although theoretically identical, the two structures shown in FIGS. 1A and 1B may lead to different implementations. In practice, the channel responses are not known a-priori and are also time-varying. Hence, an adaptive implementation is desirable.

Figure 1C:
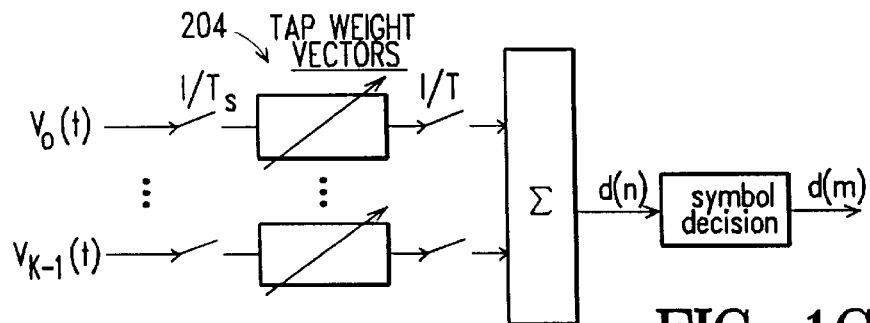
FIG. 1C is a block diagram of an adaptive receiver with a K-channel equalizer.
Figure 1D:
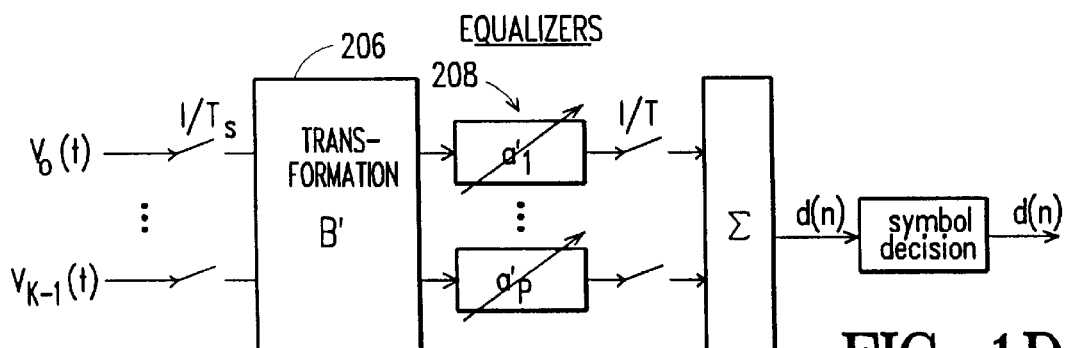
FIG. 1D is a block diagram of an adaptive receiver with a combiner and a P-channel equalizer.

In an adaptive implementation, one can either make no assumptions about the spatial distribution of signals across the array, and implement a pure diversity structure as shown in FIG. 1C or alternatively, one may resort to angle of arrival estimation and implement a beamformer and a P-channel combiner as shown in FIG. 1D. The tradeoffs made in selecting a particular implementation are many and provided that the plane-wave propagation assumption holds, largely depend on the ability to estimate and track the angles of arrival.

In a practical situation, the linear equalizer and the matched filters will be realized together in a bank of fractionally-spaced adaptive filters of finite length. Regardless of the type of equalization/detection algorithm used, the front part of the receiver will include such adaptive filters, which are responsible for obtaining the correct symbol timing, and coherent multichannel combining. Because UWA channels exhibit rapid phase fluctuations, in practice these filters should be accompanied by carrier phase tracking loops. One approach to incorporating a multichannel carrier phase tracking loop into the process of equalization is described in "Adaptive Multichannel Combining and Equalization for Underwater Acoustic Communications" authored by Stojanovic. et al published in Journal of Acoustic Society of America, vol. 94 p. 1621, September 1993.

If the number of sensors is larger than the number of propagation paths, the class of receivers which rely on the spatial signal distribution provides the advantage of lower computational complexity. For applications such as long-range transmission at signaling rates of several hundred symbols per second, each of the adaptive filters may require 100 coefficients to be updated periodically. With a receiver array of 20 elements for example, every reduction in complexity becomes extremely important. On the other hand, a fully adaptive K-channel equalizer has the main advantage in not requiring any a-priori knowledge of the spatial distribution of signals, such as the number of multiple arrivals. It is therefore insensitive to any model mismatch, in the sense that it implicitly estimates the model parameters during the process of adaption.

Finite length equalizers may be optimized based on the minimization of the mean-squared-error (MSE) between the true and the estimated data symbol.

$$MSE = E\{|d(n)) - \hat{d}(n)|^2\}.$$

In the case of a full K-channel equalizer with $T_s$-spaced tap-weight vectors $\{c_k\}$ 204, the estimated data symbol is given by $$\hat{d}(n) = [c'_o \ldots c'_{K-1}] \begin{bmatrix} v_o[n] \\ \vdots \\ v_{K-1}[n] \end{bmatrix} = c'v[n] \quad \text{Equation 22}$$

where $v_k[n]$ is the vector of the received signal samples currently stored in the $k^{th}$ equalizer. The MMSE solution for the overall equalizer vector is readily obtained as $$C = R_{vv}^{-1} R_{vd} \quad \text{Equation 23}$$

where the notation $R_{xy} = E\{x[n]y'[n]\}$ is used to denote the cross-correlations.

The finite length equalizer of FIG. 1D uses knowledge of the angles of arrival in a fixed transformation B 206. Guided by the structure of the optimal receiver, this transformation may be chosen as $B = \Phi$. The input signal vector to the $p^{th}$ equalizer is $$W_p[n] = [v_o[n] \ldots v_{K-1}[n]] b^*_p = V[n] b^*_p \quad \text{Equation 24}$$

where $b_p$ is the $p^{th}$ column of B.

The equalizers $\{a_p\}$ 208 accomplish the tasks of path-matched filtering and symbol-spaced equalization, yielding the symbol estimate $$\hat{d}(n) = [a' \ldots a_p] \begin{bmatrix} w_1[n] \\ \vdots \\ w_P[n] \end{bmatrix} = a'w[n] \quad \text{Equation 25}$$

The MMSE solution for the P-channel equalizer can now be expressed as:

$$a = R_{ww}^{-1} R_{wd} \quad \text{Equation 26}$$

Hence, any type of adaptive, decision-directed algorithm can be applied to the signals w[n] and v[n] to obtain the multichannel equalizer tap-weights a and c, respectively. A recursive least squares (RLS) type of algorithm is generally preferred to a least mean square (LMS) type because of its faster convergence properties needed for rapidly varying channels such as the ocean channel.

Joint Adaptive Equalization and Angle of Arrival Tracking

Because of the motion between the receiver and the transmitter, the true angles of arrival will generally change in time. To obtain a tracking algorithm for the angle estimates $\{\phi_p\}$, the special structure of the transformation $B = \Phi$, which corresponds to the optimal combiner's beamforming part may be exploited.

The general objective is to find the minimum mean square error (MMSE) estimates of the angles $\{\phi_p\}$ which are jointly optimal with the equalizer vectors $\{a_p\}$ expressed in Equation 26.

To obtain the MMSE angle estimate $\hat{\phi}_p$, it is convenient to use the shorthand notation of Equations 27 and 28

$$P_{pk} = a'_p v_k(n) \quad \text{Equation 27}$$

$$P_p(\phi) = \sum_{k=0}^{K-1} P_{p,k} e^{jk\phi} \qquad \text{Equation 28}$$

The estimated data symbol can now be represented as $$\hat{d}(n) = \sum_{p=1}^{P} P_p(\hat{\phi}_p) \qquad \text{Equation 29}$$

The error $e(n)=d(n)-\hat{d}(n)$ is expressed in terms of $\hat{\phi}_p$ as $$e(n)=d(n)-\Sigma_{i \neq p} P_i(\hat{\phi}_i)-P_p(\hat{\phi}_p)=Q_p-P_p(\hat{\phi}_p) \qquad \text{Equation 30}$$

where $Q_p$ is independent of $\hat{\phi}_p$. Differentiating the MSE= $E\{|Q_p-P_p(\hat{\phi}_p)|^2\}$ with respect to $\hat{\phi}_p$, results in $$\frac{\partial MSE}{\partial \hat{\phi}_p} = -2Re\{E\{\dot{P}_p(\hat{\phi}_p)e^*(n)\}\} \qquad \text{Equation 31}$$

where $$\dot{P}_p(\phi) = \frac{\partial P_p(\phi)}{\partial \phi} = j \sum_{k=1}^{K-1} k P_{p,k} e^{jk\phi} = jF_p(\phi) \qquad \text{Equation 32}$$

With this notation, the MMSE solution $\hat{\phi}_p$ has to satisfy $$\frac{\partial MSE}{\partial \hat{\phi}_p} = 2Im\{E\{F_p(\hat{\phi}_p)[Q_p - P_p(\hat{\phi}_p)]^*\}\} = 0 \qquad \text{Equation 33}$$

To obtain a recursive solution for the angles $\{\hat{\phi}_p\}$, the angular error at iteration n may be defined as $$\psi_p(n)=Im\{F_p(\hat{\phi}(n))e^*(n)\} p=1\ldots P. \qquad \text{Equation 34}$$

The current estimate $\hat{\phi}_p(n)$ can then be updated as $$\hat{\phi}_p(n+1) = \qquad \text{Equation 35}$$
$$\hat{\phi}_p(n) - K_1 \psi_p(n) - K_2 \sum_{m=0}^{n} \psi_p(m) \quad p=1\ldots P$$

with appropriately chosen angle tracking constants $K_1$, $K_2$, and initial values of the estimates.

The outlined solution is obtained based on the principles of a second-order digital phase-locked loop. It should be noted however, that Equation 35 represents only the phase for the angle of arrival, and that for practical applications, an additional carrier phase tracking loop may have to be associated with each of the propagation paths to compensate for their carrier frequency distortions. This can be preformed using the joint-estimation principles in a manner similar to that described in the above-mentioned article entitled "Adaptive Multichannel Combining and Equalization for Underwater Acoustic Communications."

Reduced Complexity Adaptive Multichannel Receiver

As mentioned above, the main advantage of using a receiver with a K×P beamformer and a P-channel equalizer as shown in FIG. 1B is reduction in complexity over the conventional full K-channel equalizer. The main disadvantage of such a receiver is that it relies heavily on the assumed spatial distribution of the signals.

While the K×P beamformer and P-channel equalizer and the full K-channel equalizer approaches may represent two extremes, it is also possible to combine these approaches in order to reduce the computational complexity of the fully adaptive multichannel equalizer, while not making any explicit assumptions about the underlying spatial signal distribution. This can be accomplished by using a K×P matrix beamformer of unconstrained structure, together with a P-channel equalizer. In fact, here, it is not required that P have the same physical meaning as in the optimal combiner structure.

The reduced-complexity receiver has the same general structure as shown in FIG. 1D, except that the value of the beamforming matrix B is adjusted adaptively. Joint optimization of the beamformer and the equalizer elements will ensure the MMSE performance of the given receiver structure.

The optimal value of the overall beamforming vector $b'=[b'_1 \ldots b'_P]$ is given by $$b=R_{uu}^{-1}R_{ud} \qquad \text{Equation 36}$$

where u[n] is comprised of the equivalent input signals to the beamformer.

$$u_p[n]=V^T[n]a^*_p, p=1\ldots P \qquad \text{Equation 37}$$

Expressions (26) and (36) will be used together to obtain the algorithm for joint adaptation of the beamformer and the equalizer. With each of the equalizers having length N, a total of K×P+P×N taps have to be computed per iteration, as opposed to the K×N taps of the full diversity combiner.

This receiver structure is similar to a so-called subarray beamformer. In subarray beamforming, the reduction in complexity of a large adaptive array is achieved by using a fixed matrix beamformer to reduce the total number of the array signals, and then adaptively processing the obtained smaller number of signals. This method was originally developed with the only purpose of spatial signal processing, i.e. no temporal processing is involved. The reduction in complexity is achieved at the expense of calibrating the fixed matrix beamformer. For this reason the phrase "subarray beamforming" is used as opposed to the phrase "fully adaptive beamforming."

In the present invention, the reduced complexity structure only resembles the subarray beamformer. However, both the matrix beamformer and the reduced-complexity multichannel equalizer remain adaptive. As long as there exists an underlying spatial signal distribution which permits the decomposition of the optimal combiner into the beamformer and the reduced-complexity equalizer, sacrifice in receiver performance need not be made to achieve the reduction in complexity. Thus, this class of fully adaptive, but reduced-complexity receivers for simultaneous beamforming and multichannel equalization is the class that is best suited for practical implementation.

Figure 2:
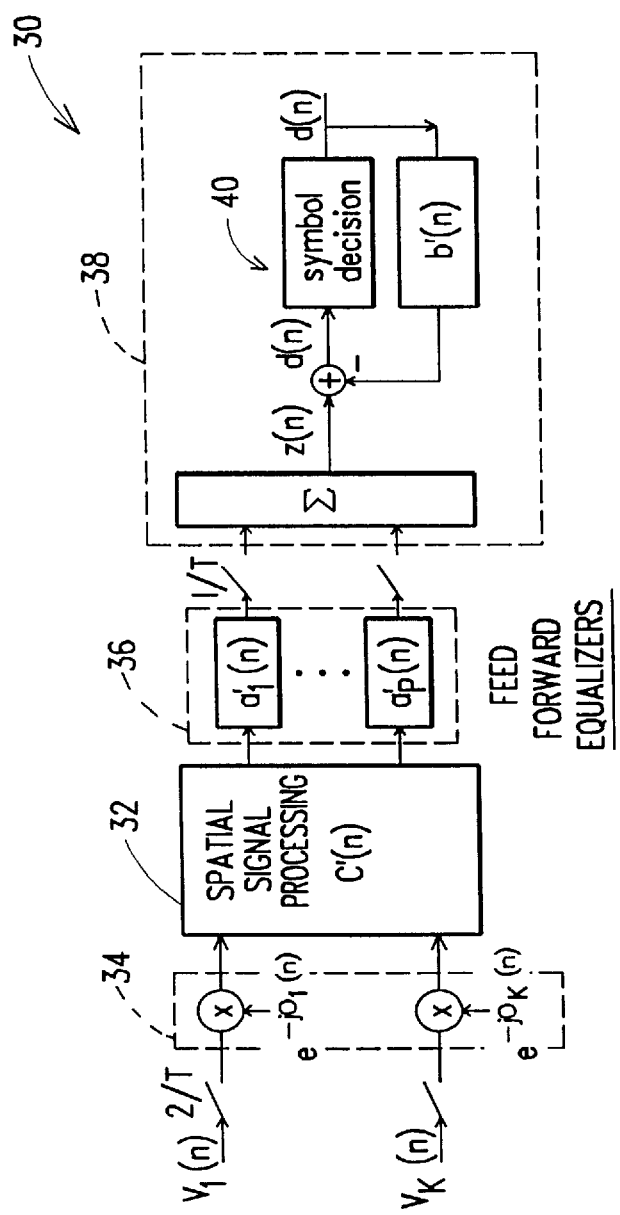
FIG. 2 is a block diagram of a reduced complexity adaptive multichannel receiver using decision feedback equalizers.

Referring now to FIG. 2, a reduced complexity multichannel receiver 30 is shown. The front part of the receiver 30 includes spatial signal processing means 2–12 which is provided as a K×P reduced complexity combiner. Spatial signal processing means 32 is preceded by a multichannel digital phase locked loop (DPLL) 34. The reduced complexity combiner reduces the K channel signal into a P channel signal which are fed to a bank of P-channel feed forward equalizers 36.

A temporal processing and final combining means 38 is coupled to the spatial signal processing means 32 through the P-channel equalizer 36. The bank of P feedforward equalizers 36 may be provided as T/2-spaced transversal filters which accomplish adaptive match filtering and linear equalization.

In the reduced complexity multichannel receiver 30, the spatial and temporal processor components have been jointly optimized to ensure optimal performance of the receiver 30 while at the same time providing the advantage of reduced complexity. In a narrow-band case if the reduced number of channels to be equalized, P, is greater than or equal to the number of propagation paths, the reduced complexity multichannel receiver 30 can achieve the same performance as its full complexity counterpart.

A multichannel decision feedback equalizer (DFE) is an adequate equalizer for UWA channels characterized by extremely long impulse responses. Thus, in this particular embodiment, the multichannel receiver 30 utilizes a DFE 40.

It should be noted, however, that the reduced complexity combiner can be used in conjunction with any type of equalization method. For example, linear or maximum likelihood sequence estimation equalizers can also be used.

The receiver 30 receives complex baseband input signals $v_1(n)$–$v_K(n)$. The input signals $v_k(n)$ are here assumed to be band-limited to the signaling rate $1/T$ and frame synchronized prior to sampling at twice the signaling rate as is generally known.

The receiver parameters are updated once per symbol interval or slower and the output of the linear part of the receiver is accordingly delivered to the feedback section. The receiver parameters to be optimized in this particular embodiment are: the carrier phase estimates $\{\theta_{k,k=1},\ldots,K\}$; the combiner (beamformer) vectors $\{C_{p,p=1},\ldots,p\}$ each having K elements; the feedforward equalizer vectors $\{a_p\}$ with N elements and the feedback tap filter vector b.

Assuming initially that the channel is fixed in some interval of time, the optimal values of the receiver parameters may be computed. Tracking of the optimal solution may be accomplished via a second-order gradient update for the multichannel DPLL and a double application of a recursive least squares (RLS) algorithm for obtaining combiner coefficients and the coefficients of a multi-channel DFE.

After compensating for the carrier phase distortions, the input signal samples at time nT are represented in a matrix as shown in Equation 38

$$V(n)=[v_1[n]e^{-j\theta^1}\ldots v_K[n]e^{-j\theta j\theta k}] \quad \text{Equation 38}$$

where $$v_K[n] = \begin{bmatrix} v_K(nT+N_1T/2) \\ \cdot \\ \cdot \\ \cdot \\ v_K(nT-N_2T/2) \end{bmatrix} \quad \text{Equation 39}$$

Where $N_1$, $N_2$ determine the total length of the feedforward equalizer. The estimated data symbol, which is input to the decision device, is given by $$\hat{d}(n)=z(n)-b'\tilde{d}(n) \quad \text{Equation 40}$$

where z(n) represents the output of the linear part of the receiver after coherent combining; and $\tilde{d}(n)$ is the vector of M previously detected symbols stored in the feedback filter.

In Equation 40, all vectors are defined as column vectors, and a prime denotes conjugate transpose. Filter coefficients are taken as conjugate for convenience of notation. For linear modulation formats, the symbol decision at time n, $\hat{d}(n)$, is obtained by quantizing the estimate $\tilde{d}(n)$ to the nearest signal point. Since the receiver parameters are optimized jointly, the overall adaptation algorithm relies on the error between the true and the estimated data symbol, $e(n)=d(n)-\tilde{d}(n)$.

To obtain the carrier phase update equations it is useful to represent the variable z(n) as $$z(n) = \sum_{k=1}^{K} A_k(n)e^{-j\theta k}, A_k(n) = \sum_{p=1}^{P} C^*_{k,p} a_p v_k[n] \quad \text{Equation 41}$$

This representation leads to the definition of equivalent phase detector outputs as $$\phi_k(n)=I_m\{A_k(n)e^{-jk}e^*(n)\}, k=1,\ldots K \quad \text{Equation 42}$$

Application of the second-order DPLL principles yields the carrier phase update equations $$\theta_k(n+1) = \theta_k(n) + K_{f1}\Phi_k(n) + K_{f2}\sum_{m=0}^{n}\Phi_K(m) \quad \text{Equation 43}$$

where $K_{f1,2}$ are the phase tracking constants. Similarly as in the full-complexity multichannel equalizer case, because of the severe phase fluctuations observed in many of the UWA channels, successful operation of the entire receiver strongly depends on the use of a second-order phase update in each of the K channels.

MMSE optimization of the combiner/equalizer parameters requires their equivalent input data vectors to be defined. To do so, the variable z(n) is represented in two ways:

$$z(n) = [C'_1 \ldots C'_p] \begin{bmatrix} V^T(n)a_1^* \\ \cdot \\ \cdot \\ \cdot \\ V^T(n)a_p^* \end{bmatrix} = c'u[n] \quad \text{Equation 44}$$

or $$z(n) = [a'_1 \ldots a'_p] \begin{bmatrix} V(n)c_1^* \\ \cdot \\ \cdot \\ \cdot \\ V(n)c_p^* \end{bmatrix} = a'w[n] \quad \text{Equation 45}$$

Vectors c and a in the above expressions represent the composite vectors of all combiner and equalizer vectors, respectively. The last expressions define the needed data vectors which are: u[n], the equivalent input to the combiner as defined by Equation 44; and w[n], the equivalent input to the multichannel feedforward equalizer as defined by Equation 45. An RLS type of algorithm is used to update the combiner vector c(n), as directed by the input data u[n] and the error e(n). A second RLS update is used for the overall equalizer vector $$e(n) = \begin{bmatrix} a(n) \\ -b(n) \end{bmatrix} \quad \text{Equation 46}$$

The input data for this update is a composite vector $$x[n] = \begin{bmatrix} W[n] \\ \hat{d}(n) \end{bmatrix} \quad \text{Equation 47}$$

while the error remains the same. Assuming correct decisions, the desired MMSE solutions are given by $$c = [E\{u[n]u^*[n]\}]^{-1} E\{u[n](d(n)+b'\hat{d}(n))^*\} \quad \text{Equation 48}$$

and $$e = [E\{x[n]x^*[n]\}]^{-1} E\{x[n]d^*(n)\} \quad \text{Equation 49}$$

Because there is no unique solution for the combiner/equalizer coefficients (i.e. there are infinitely many solutions which lead to the global minimum of the MSE) proper initialization must be used to set the starting point outside the region of a local minimum. For example, not all the coefficients can be taken to be zero. Possible solutions for the combiner which allow the equalizer coefficients to reach the jointly optimal solution in the case of a stationary environment with fixed, known angles of signal arrivals from multiple propagation paths as discussed in the publication "Adaptive Receivers for Underwater Acoustic Communications: Their Relation to Beamforming and Diversity Combining" by Stojanovic et al published in Proc. Comcon 4, Rhodes, Greece. One of these solutions is to choose each of the beamforming vectors $c_p$ equal to the steering vector corresponding to the $p^{th}$ propagation path. However, since it is unlikely that such detailed knowledge about propagation conditions will be available at the receiver, a more general initialization procedure is desired.

Without showing its optimality, the following initialization procedure may be used. At the start of adaptation, the combiner value is kept fixed at an initial value, while the equalizer coefficients are updated from an all-zero condition. When the equalizer has converged (in about twice the number of its taps), the beamformer begins its update. The initial values of the beamformer vectors $c_p$ can be selected to have all zeros and a one at position p. In such a way, the beamformer initially passes to the equalizer the P arbitrarily chosen channels, without processing them. Later, it gains access to all K channels, and begins their combining towards reducing the output MSE.

Since a separate update is used for the combiner and the equalizer, both the type of algorithm and the rate of its convergence can be chosen independently for the two. When very long channel responses are to be equalized, the multi-channel DFE operates under a fast, numerically stable RLS. On the other hand, the combiner's algorithm can be chosen as a standard RLS if the value of the product of K and P is small enough to justify such choice. A choice of slightly different RLS forgetting factors, which allows faster convergence of the combiner, may help improve the convergence rate of the overall algorithm.

With currently available processing speeds, and relatively low candidate symbol rates for long-range UWA communications, computational complexity itself is not a limiting factor. For example, With 50 Mflops, and both feedforward and feedback equalizers of length 100, which is representative of the worst observed case for 1000 symbols per second transmission, up to 50 channels can be theoretically accommodated. However, at shorter ranges, which support much higher data rates the allowable number of channels reduces to only a few, making the use of reduced-complexity receivers, together with computationally efficient algorithms, imperative for processing a large number of channels.

Even when the computational complexity allows the use of optimal, full-complexity multichannel equalization, with increased number of taps to be updated, numerical stability imposes additional restrictions for use of the fastest RLS algorithms. To preserve stability, the forgetting factor of this algorithm should be selected as $\lambda > 1 - 1/(2 \times \text{total number of taps})$. For a small number of taps, allowable values of $\lambda$ lie well within the region of practical interest, for example, $\lambda \geq 0.98$). For large number of taps, $\lambda$ becomes confined to relatively large values. For example, with 100 feedforward taps, 100 feedback taps, and 4 channels, $\lambda$ should be greater than 0.999. These values may be too high to provide adequate tracking for many of the UWA channels. In such a case, reduced-complexity multichannel processing provides an alternative to using other types of RLS algorithms, such as gradient lattice algorithms, which are inherently stable at the expense of increased complexity.

Finally, as is known, noise enhancement in large adaptive filters represents a serious problem for full-complexity multi-channel equalization. The reduced-complexity approach plays a vital role in this case, since it enables the multiple sensor signals to be combined prior to equalization, thus additionally exploiting the spatial variability of the ocean channel. Equalizing the so-obtained smaller number of signals has the important feature of keeping the noise enhancement at minimum.

Results of a reduced complexity multichannel equalizer using the algorithm described above are provided in the article "Reduced-Complexity Simultaneous Beamforming and Equalization for Underwater Acoustic Communications" Proceedings of the Oceans Conference October 1993, which is incorporated herein by reference.

Figure 3:
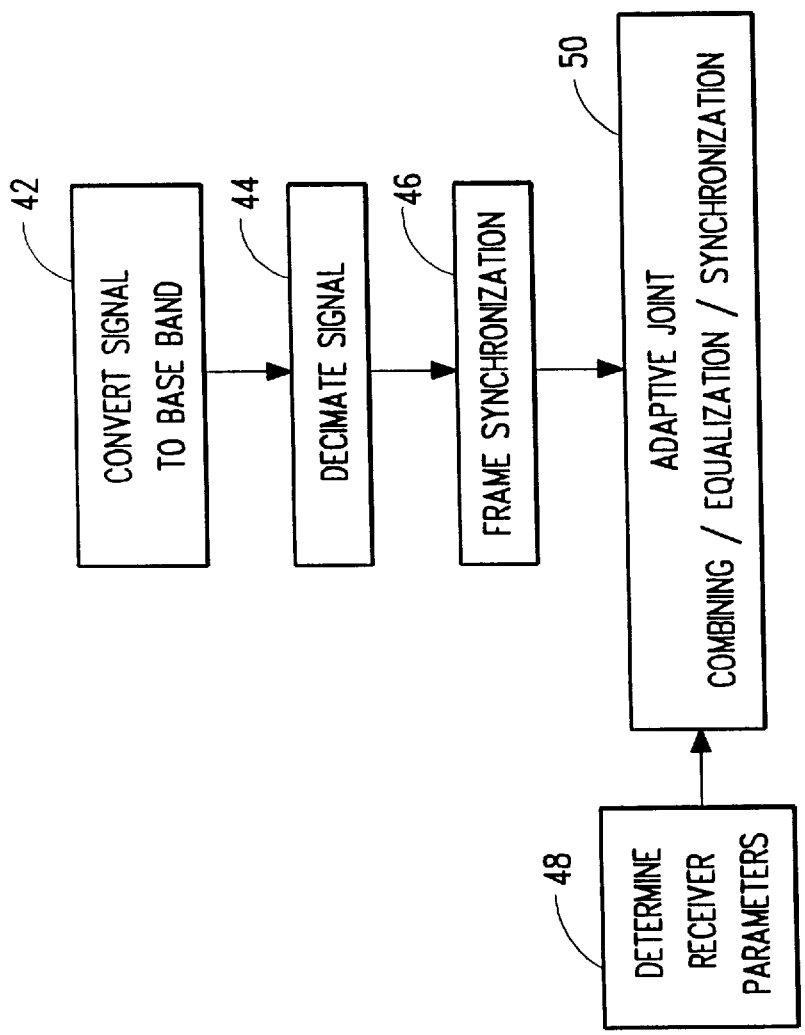
FIG. 3 is a flow diagram illustrating the steps used in a reduced complexity multichannel receiver.

FIG. 3 shows a flow diagram of the processing performed in the reduced complexity adaptive multichannel receiver 14 (FIG. 1) of communication system 10 (FIG. 1) to combine the K sensor output signals $v_0(t)$ through $v_{K-1}(t)$ into the output symbol sequence d. In the flow diagram, the rectangular elements (typified by element 42) herein denoted "processing blocks" represent computer software instructions or groups of instructions. The flow diagram does not depict syntax or any particular computer programming language. Rather, the flow diagram illustrates the functional information one skilled in the art requires to generate computer software to perform the complete signal processing. It should be noted that many routine program elements such as initialization of loops and variables and the use of temporary variables are not shown in the flow diagram.

Turning now to FIG. 3, as shown in step 42 the signal is first brought to baseband and decimated. This may be accomplished by multiplying the raw received signal by the carrier and passing the signal through a low pass filter. The filtered signal is then down-sampled to a desired number of samples per symbol interval as shown in step 44. Generally the receiver does not require a sampling rate faster than the Nyquist rate, however, it is recognized that a sampling rate higher than the Nyquist rate may be used. An example of a matlab code which performs the above steps is provided as Appendix A and the overall signal parameters are listed in Appendix B.

Next, a frame synchronization step 46 is performed by matched filtering to a channel probe, or preamble, which precedes every data block. The channel probe may be provided for example, as a 13 element Barker code. The signal timing is determined in the absence of phase knowledge as that where the absolute value of the cross-correlation with the channel probe reaches a maximum value. The accuracy of this process is generally to within one symbol interval. Higher accuracy can be achieved by subsequent processing; however, such a procedure is not necessary when a fractionally spaced equalizer is used. An example of matlab code which performs such preamble detection is shown in Appendix C.

Based on the coarse channel estimate as represented by the channel probe matched filter output, and on the general experience with the particular communication channel, receiver parameters can now be determined as indicated in step 48. These parameters include but are not limited to 1) equalizer length (feedforward and feedback), 2) carrier phase tracking constants, and 3) the recursive least squares (RLS) forgetting factor of the equalizer. In addition to these parameters, standard initial values are listed in matlab code shown in Appendix D.

Next, as shown in step 50, an adaptive joint equalization/ synchronization step is performed. As described above in conjunction with FIGS. 1 and 2 an essential part of the receiver, the jointly optimized equalizer/synchronizer, is operated in an adaptive manner by an algorithm. A variety of equalizer algorithms may be used including but not limited to LMS and RLS algorithms. In one embodiment, the algorithm may be based on a combination of recursive least squares (RLS) for the equalizer tap-weight update and combiner update and a second-order digital phase-locked loop for the carrier phase estimation. An example of a matlab code which performs these tasks is provided in Appendix E.

It should be noted, however, that there exist many different RLS implementations which may be used. The exemplary RLS implementation shown in Appendix D corresponds to a fast, numerically stable implementation of a transversal RLS. Each of the subroutines needed in this implementation may be included as separate matlab m-files.

Those of ordinary skill in the art will recognize of course that the particular type of RLS implementation which is used may vary according to the particular implementation and that other types of RLS schemes may also be used without altering the main concept of the receiver design. Thus, the example provided herein is intended to be illustrative only and is not intended to limit the type of algorithm which may be used in accordance with the concept of the invention.

Furthermore, although the particular embodiment as described herein has focused on underwater acoustic channels, those of skill in the art after reading the description provided herein will appreciate that the algorithm described herein may be used in a wide variety of multichannel communication systems. Such communication systems include but are not limited to radial communication systems which use multiple antennas at the receiver and as well as systems which use multiple transmitting antennas to obtain increased directivity. Thus, in view of the present description, the described algorithm may be adapted by those of ordinary skill in the art to work equally well in underwater and above water communication systems.

Accordingly, having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

APPENDIX A

```
%   demdecim.m param;

name=[int2str(range),'nm',mod,int2str(fb),'ch',int2str(chan),'raw'];
sig=['nm',int2str(range),mod,int2str(fb),'ch',int2str(chan),'raw'];
loadfile=['/data1/cs/',name];
savefile=['cs_',mod,int2str(fb),'_d',int2str(Ns),'_fil_',int2str(range),'nm_ch',int decim=fix(fs/fb/Ns);

eval(['load ' loadfile]);
qpsk=eval(sig);
qpsk=qpsk.*exp(-j*2*pi*fc/fs*(0:length(qpsk)-1));
qpsk_decim=decimate(qpsk,decim,'fir');

%%%%%%%%%%%%%%%%%%%%%%%%%%%%%%%%%%%%%

%lp_fil_0125=remez(255,[0 0.125 0.17 1],[1 1 0 0]); %3/4T bw for Ns=12
%lp_fil_015=remez(255,[0 0.15 0.25 1],[1 1 0 0]); %3/4T bw for Ns=10;
%lp_fil_016=remez(255,[0 0.16 0.25 1],[1 1 0 0]);
%lp_fil_075=remez(255,[0 0.75 0.8 1],[1 1 0 0]); % 3/4T bw for Ns=2;
%lp_fil_0375=remez(255,[0 0.375 0.45 1],[1 1 0 0]); % 3/4T bw for Ns=4;

if Ns==12; load lp_fil_0125; end;
if Ns==10; load lp_fil_015; end;
if Ns==2; load lp_fil_075; end;
if Ns==4; load lp_fil_0375; end;

qpsk_decim_fil=filter(lp_fil,1,qpsk_decim);
clear qpsk_decim lp_fil;

plot(abs(qpsk_decim_fil(1:50000)));
start=input('start of signal = ');
qpsk_decim_fil=qpsk_decim_fil(start:length(qpsk_decim_fil));

eval(['save ', savefile, ' qpsk_decim_fil']);
```

APPENDIX B

```
%   param.m fm=333.33; % symbol rate
range=48;
chan=8; % channel of the array
mod='qpsk'; % modulation
Ns=12; % use 12 for rate 3*, 10 for rate 1* except for 1k, or 2 and 4 for both
fs=4000; % input sampling rate
fc=1000; % carrier
```

APPENDIX D C

```
% brkdet.m param;
decim=fix(fs/fb/Ns);
fs=fs/decim;
Np=43;

loadfile=['cs_',mod,int2str(fb),'_d',int2str(Ns),'_fil_',int2str(range),'nm_ch',int
savefile=['cs_',mod,int2str(fb),'_d',int2str(Ns),'_',int2str(range),'nm_ch',int2str

%%%%%%%%%%%%%%%%%%%%%%%%%%%%%%%%%%% eval(['load ' loadfile]);
v=qpsk_decim_fil;clear qpsk_decim_fil;
plot(abs(v(1:length(v)/10)));
title('channel probe');
nbr=input('length for chan. probe detection : ');
v=v/sqrt(power(v/2));

b=[-1 1 -1 1 -1 -1 1 1 -1 -1 -1 -1 -1];
for i=1:13; br=[br b(i)*ones(1,Ns)];end;

kl=10;kr=30;
[vb,ib,xb,ab]=allign(v(1:nbr),br);
plot([-kl*Ns:kr*Ns]/Ns,abs(xb(ib-kl*Ns:ib+kr*Ns)));
xlabel('[symbol intervals]');
title('channel');
SNR=10*log10(abs(xb(ib))^2/13/(power(xb(1:ib-13*Ns))))

v=v(ib+13*Ns+fs+Ns+Ns/2:length(v));

eval(['save ' savefile ' v  SNR']);
```

```
% allign.m - fast crosscorrelation function [va,i,x,aa]=allign(v,u);
K=ceil(log10(length(v))/log10(2));
x=ifft(fft(v,2^K).*conj(fft(u,2^K)));
[m,i]=max(x);
aa=angle(x(i));
va=v(i:i+length(u)-1);
```

APPENDIX D

```
% config.m global L lamb

FS=2; % fractional spacing
N=FS*(2+2); % feedforward taps
NN=N/FS; % symbols spanned by ff filter
Nplus=4;%NN/2; % delay in the equalizer
M=20; % number of feedback taps
ch=1:4; %channels to be processed;
K=length(ch); % number of channels
Ke=K; % number of equalizers;
B0=zeros(K,Ke);inch=1:Ke; %initial channels to be passed to the equalizer
for ke=1:Ke;B0(inch(ke),ke)=1;end;
delta=0.001;Pe=eye(N*Ke+M)/delta;L=0.995;lamb=L;
Lmin=1-1/2/(Ke*N+M);
if L<=Lmin,disp(['L is smaller than Lmin=',num2str(Lmin)]),
end
P=eye(K*Ke)/delta; Lbf=0.99;
Ntb=2*(Ke*N+M);
Nt=4*(K*N+M); % fix this as a function of fm
Nd=1500;
Kf1=0.005;Kf2=Kf1/10;Lf=1;
eval(['load dseq_',mod]);
dseq=eval(['dseq_',mod]);
d=dseq(1:Nt);
v=v(ch,:);
```

APPENDIX E

```
%%%%%%%%%%%%%%%%%%%
% jointfast.m
%%%%%%%%%%%%%%%%%%%
global  vindex  maska lamb lambin An Bn Cn alfin betn betni gamn gamni % Initialization f=zeros(1,K);            % phase
Sf=zeros(1,K);                % PLL integrator output
y=zeros(Ke*N+M,1);    % input data vector for ftf : has shifting property
yold=y;           % y from previous iteration
c=zeros(1,Ke*N+M);    % all equalizer taps (negative), arranged to agree with y
%B0=zeros(K,Ke);B0(4,1)=1;%for ke=1:Ke; B0(ke,ke)=1;end;
%B0=ones(K,Ke);
B=B0;
bf=reshape(B0,1,K*Ke);
vf=zeros(K,N);
dec=0;             % latest decision
sse=0;             % sum of squared errors
KK=K;K=Ke;indexfast;K=KK;            % indexing the elements of c,y
%KV=[1.5 2.5 1 0 1];   % error-feedback vector of stabilizing coefficients; reco
%KV=[1 1 0 0 1]; % stable
KV=[1 1 1 0 1]; % stable
initial4(length(y)) % initialization for ftf
%%%%%%%%%%%%%%%%%%
for n=1:Nd; n
%%%%read new sample%%%% nb=(n-1)*Ns+(Nplus-1)*Ns; % current input sample
    vfn=v(:,nb+ceil(Ns/FS/2):Ns/FS:nb+Ns);
    for k=1:K;
        vfn(k,:)=vfn(k,:)*exp(-j*f(n,k));   % phase correction before bf
    end;
    vfn=fliplr(vfn);
    vf=[vfn vf]; vf=vf(:,1:N);

xn=B'*vfn;   % KxKe beamforming yin=[reshape(xn.',Ke*FS,1); dec];         % incomming 'sample' for ftf
    yout=yold(vindex);              % outcomming 'sample' for ftf
    y=[yin; yold(maska)];        % new data vector for ftf %%%%compute new signals%%% w=[];
    for ke=1:Ke;
        w=[w  -c(Indexa(ke,:))*conj(vf')];
    end;

for k=1:K;   % equivalent output of k-th  section with corrected phase
```

- 62 -

```
        p(k)=0;
        for ke=1:Ke;
            p(k)=p(k)-conj(B(k,ke))*c(Indexa(ke,:))*conj(vf(k,:))';
    end;

psum=sum(p);   % output of ff section with corrected phase
    z(n)=psum;
    q=c(indexb)*y(indexb);      % output of fb section
    de(n)=psum-q; % estimate of data d(n)

if n>Nt;              % Nt=training length
        d(n)=real(decision(de(n))); % BPSK
%       d(n)=decision(de(n));       % QPSK
%       d(n)=decision8(de(n));      % 8-QAM
%       d(n)=decision8psk(de(n));    % 8-PSK
    end;
    dec=d(n);

e=d(n)-de(n); % error
    ebf=d(n)+q-w*bf';
    edelta(n)=e-ebf;

et(n)=abs(e^2);
    sse=sse+abs(e^2);
    mse(n)=sse/n; mse(n)

%%%%parameter update%%%% phi=imag(p.*conj(p+e)); % phase detector array output
    Sf=Lf*Sf+phi;                   % PLL
    f(n+1,:)=f(n,:)+Kf1*phi+Kf2*Sf;

if n>Ntb;

kal=P/Lbf*conj(w')/(1+conj(w)*P/Lbf*conj(w'));   %RLS FOR BF
    bf=bf+conj(kal')*conj(ebf);
    P=P/Lbf-kal*conj(w)*P/Lbf;
    B=reshape(bf,K,Ke);

end;

c=sftf4(e,yin,y,yold,yout,c,KV);            % FAST RLS FOR EQUALIZERS yold=y;

end;

f=f';
L=lamb;
```

- 63 -

```
function W=sftf4(err,vn,Yn,Ynp,rn,W,KV)

%    Subroutine for adaptation of tap weights vector W by using
%    multichannel, complex, fast transversal filter RLS algorithm
%    Input parammeters:
%         - err - error signal
%         - vn - vector with the newest input data
%         - Yn - current  input data vector
%         - Ynp - input data vector from previous iteration
%         - W - previous tap weights vector %    Output parameters:
%         - W - current tap weights vector
%    Subroutine uses following global parameters :
% An,Bn,Cn,alfin,betn,betni,gamn,gamni,lamb,lambin,vindex and maska global An Bn Cn alfin betn betni gamn gamni lamb lambin  vindex maska K1=KV(1);
K2=KV(2);
K3=KV(3);
K4=KV(4);
K5=KV(5);
enp=vn+An*Ynp;
en=enp*gamn;
Cn10=-(alfin*enp*lambin)';
Cn1fr=Cn10;
Cn11a=Cn+Cn10*An;
lCn1=Cn11a(vindex);          % Separation of the oldest p elements
fCn1=[Cn1fr Cn11a(maska)];   % Separation of th newest N elements
gamn1i=gamni-Cn10*enp;
An=An+en*Cn;
rnpf=rn+Bn*Yn;
lCn1f=-(betni*rnpf*lambin)';
lCn1s=lCn1;
rnps=-lamb*betn*lCn1s';
rnp1=K1*rnpf+(1-K1)*rnps;
rnp2=K2*rnpf+(1-K2)*rnps;
rnp5=K5*rnpf+(1-K5)*rnps;
lCn1=K4*lCn1f+(1-K4)*lCn1s;
Cn=fCn1-lCn1*Bn;
gamnsi=gamn1i+lCn1s*rnp5;
gamnfi=1-Cn*Yn;
gamni=K3*gamnfi+(1-K3)*gamnsi;
gamn=1/gamni;
alfin=alfin*lambin-Cn10'*Cn10/gamn1i;

rn1=rnp1/gamnsi;
rn2=rnp2/gamnsi;
Bn=Bn+rn1*Cn;
betn=lamb*betn + rn2*rnp2';

lCn12=K2*lCn1f+(1-K2)*lCn1s;
gamn12i=gamnsi-lCn12*rnp2;
betni=betni/lamb-lCn12'*lCn12/gamn12i;

errn=err*gamn;
W=W+errn*Cn;
```

- 64 -

```
% indexfast.m

% Indexing for multichannel ftf algorithm

% maska=elements of the data vector which are retained for the next iteration
%vindex=elements of the data vector which go out after current iteration
%indexa=elements of the equalizer vector which correspond to feedforward part
%indexb=elements Of the equalizer vector which correspond to feedback part
%Indexa=matrix whose rows are elements of the equalizer vector which correspond if M<NN;
maska=[1:(K*FS+1)*M-1  (K*FS+1)*M+1:K*N+M-K*FS];
vindex=[(K*FS+1)*M  K*N+M-K*FS+1:K*N+M];
indexa=[]; for i=0:M;indexa=[indexa [1:K*FS]+i*(K*FS+1)];end;
indexa=[indexa (indexa(length(indexa))+1:K*N+M)];
indexb=((K*FS+1):(K*FS+1):(K*FS+1)*M);
end;

if M==NN;
maska=[1:(K*FS+1)*(M-1)];
vindex=[(K*FS+1)*(M-1)+1:M*(K*FS+1)];
indexa=[];for i=0:M-1;indexa=[indexa [1:K*FS]+i*(K*FS+1)];end;
indexb=((K*FS+1):(K*FS+1):(K*FS+1)*M);
end;

if M>NN;
maska=[1:(K*FS+1)*(NN-1)   NN*(K*FS+1):K*N+M-1];
vindex=[(K*FS+1)*(NN-1)+1:NN*(K*FS+1)-1  K*N+M];
indexa=[];for i=0:NN-1;indexa=[indexa [1:K*FS]+i*(K*FS+1)];end;
indexb=[(K*FS+1):(K*FS+1):(K*FS+1)*NN  NN*(K*FS+1)+1:K*N+M];
end;

for k=1:K;
    for l=1:FS;
        Indexak(l,:)=indexa(l+(k-1)*FS:K*FS:length(indexa));
    end;
Indexa(k,:)=reshape(Indexak,1,N);
end;
```

- 65 -

```
function initial(Ny)
% Initialization of sftf alghoritm
% Ny= data vector length
global lamb vindex alfin betn betni gamn gamni An Bn Cn lambin maska
mi=0.01;

I=eye(length(vindex));
alfin=I/mi/lamb^Ny;

betn=mi*I;
betni=I/mi;

gamn=1;
gamni=1;

Cn=zeros(1,Ny);
An=zeros(size(vindex'*Cn));
Bn=An;
lambin=1/lamb;
```

What is claimed is:

1. A multichannel receiver comprising:

means for jointly performing diversity combining, carrier recovery, channel equalization and synchronization, said means including a signal combiner having a first plurality of input ports and a second plurality of output ports wherein the second plurality of output ports is less than the first plurality of input ports adaptively operating to coherently combine signals received on said plurality of input ports such that combined signals can be processed in a subsequent multichannel equalization scheme; and a detector for detecting an output signal from said means.

2. The multichannel receiver of claim 1 wherein said means performs symbol synchronization.

3. The multichannel receiver of claim 1 wherein the multichannel equalization scheme is a decision feedback equalization scheme.

4. A receiving system comprising:

a plurality of sensors;

a multichannel receiver operationally connected to said plurality of sensors, said receiver operative to jointly perform diversity combining, carrier recovery, channel equalization and synchronization, said receiver including a combiner having a first plurality of input ports and a second plurality of output ports wherein the second plurality of output ports is less than the first plurality of input ports, and wherein said combiner coherently combines signals received on said plurality of input ports such that combined signals are suitable for subsequent multichannel equalization; and a detector for detecting an output from said receiver.

5. The receiving system of claim 4 wherein said plurality of sensors are provided as an array of hydrophones.

6. The receiving system of claim 4 wherein said plurality of sensors are provided as an array of antenna elements.

7. A communication system for transmitting and receiving communication signals through a communication channel, the communication system comprising:

a transmitter;

a sensor array having a first plurality of sensing elements for receiving a signal from said transmitter;

a multichannel receiver having a second plurality of input ports, each of said plurality of input ports coupled to a corresponding one of said plurality of sensing elements, said multichannel receiver having a third plurality of output ports wherein the third plurality of output ports is less than the second plurality of input ports and wherein said multichannel receiver is provided to jointly perform diversity combining, carrier recovery, channel equalization and synchronization, said multichannel receiver including a signal combiner operative to coherently combine signals received on said plurality of input ports such that combined signals can be processed in a subsequent multichannel equalization scheme;

an equalizer having a fourth plurality of input ports wherein each of the plurality of receiver output ports are coupled to a corresponding one of said plurality of equalizer input ports; and a detector for detecting an output signal from said multichannel receiver.

8. The communication system of claim 7 wherein said multichannel receiver performs decision feedback channel equalization.

9. The communication system of claim 8 wherein said multichannel receiver performs symbol synchronization.

10. The communication system of claim 9 wherein said multichannel receiver performs carrier synchronization.

11. The communication system of claim 7 wherein each of said plurality of sensing elements is a hydrophone.

12. The communication system of claim 7 wherein each of said plurality of sensing elements is an antenna element.

* * * * *

UNITED STATES PATENT AND TRADEMARK OFFICE
CERTIFICATE OF CORRECTION

PATENT NO. : 5,844,951
DATED : December 1, 1998
INVENTOR(S) : John G. Proakis, et al.

Page 1 of 2

It is certified that error appears in the above-identified patent and that said Letters Patent is hereby corrected as shown below:

Column 6, line 54; " $R_{n,m} = R_{n-m} - \int_{T_{obs}} f(t-nT) R_n^{-1} f(t-mT) dt$ "

should read -- $R_{n,m} = R_{n-m} = \int_{T_{obs}} f'(t-nT) R_n^{-1} f(t-mT) dt$ --.

Column 7, line 15, " $R(z) = \Lambda_m R_m z^{-m}$ "

should read -- $R(z) = \sum_m R_m z^{-m}$ --.

Column 7, line 61, " $y(n) = \Lambda_{T_{obs}} g'(t-nT) \Phi' R_n v(t) dt$ "

should read -- $y(n) = \int_{T_{obs}} g'(t-nT) \Phi' R_n v(t) dt$ --.

Column 8, lines 14 and 15, " $B = \Phi(\Phi' 101)^{-1}$ "

should read -- $B = \Phi(\Phi'\Phi)^{-1}$ --.

UNITED STATES PATENT AND TRADEMARK OFFICE
CERTIFICATE OF CORRECTION

PATENT NO. : 5,844,951
DATED : December 1, 1998
INVENTOR(S) : John G. Proakis, et al.

It is certified that error appears in the above-identified patent and that said Letters Patent is hereby corrected as shown below:

Column 8, line 59, " $B = \Phi \ (\Phi'101)^{-1}$ "

should read -- $B = \Phi(\Phi'\Phi)^{-1}$ --.

Column 11, line 11, " $e(n) = d(n) - \Sigma_{i \neq p} P_i(\hat{\phi}_i) - P_p(\hat{\phi}_p) = Q_p - P_p(\hat{\phi}_p)$ "

should read -- $e(n) = d(n) - \sum_{i \neq p} P_i(\hat{\phi}_i) - P_p(\hat{\phi}_p) = Q_p - P_p(\hat{\phi}_p)$ --.

Column 13, line 50, " $V(n) = [v_1[n]e^{-j\theta_1} \ldots v_K[n]e^{-j\theta_k}]$ "

should read -- $V(n) = [v_1[n]e^{-j\theta_1} \ldots v_K[n]e^{-j\theta_k}]$ --.

Signed and Sealed this

Seventh Day of December, 1999

Attest:

*Attesting Officer*

Q. TODD DICKINSON

*Acting Commissioner of Patents and Trademarks*